INVENTOR.
JOHN W. LORENZ
BY
Holmes & Andersen
ATTORNEYS

INVENTOR.
JOHN W. LORENZ
BY Holmes & Andersen
ATTORNEYS 3,191,668
PUMP CONTROL SYSTEM
John W. Lorenz, La Crosse, Wis., assignor to The Trane Company, La Crosse, Wis., a corporation of Wisconsin
Filed Dec. 29, 1960, Ser. No. 79,371
6 Claims. (Cl. 165—22)

This invention relates generally to air conditioning systems and more particularly to a pump control sequence for an air conditioning system which provides hot and cold heat exchange fluid simultaneously to a heat exchange unit.

In recent years the air conditioning industry has been attempting to lessen the cost of installation of air conditioning systems and at the same time provide individual control of the heat exchange units so that the occupant can adjust the heat exchange unit to provide the proper temperature for his own particular comfort. This type of system necessitates having both a supply of cold heat exchange fluid and a supply of warm heat exchange fluid available at all time. One of these schemes has become known in the industry as the three-pipe system.

The three-pipe system involves the use of separate hot and cold supply lines to each heat exchange unit in the system. The heat exchange fluid from each heat exchanger is mixed in a common return and returned to the system heater or cooler to be heated and cooled as required by the system. It is obvious that this type of system will be very uneconomical to operate unless some means are provided to direct the return water, depending on the temperature of the return water, to the proper system heat exchanger. In other words, if the return water is predominately warm the water should be returned to the heater or if the water is predominately cold the water should be diverted to the cooler.

It is therefore an object of this invention to provide a three-pipe air conditioning system in which the warm return water is returned to the heater and the cold return water is returned to the cooler.

Another object of the invention is to provide an air conditioning system in which the pumps are controlled in sequence to return the warm return water to the heater and the cold return water to the cooler.

A third object of the invention is to provide a three-pipe air conditioning system which employs two zones and return water from these zones is returned to the heater or cooler by thermostatically controlled pumps.

Figure 1:
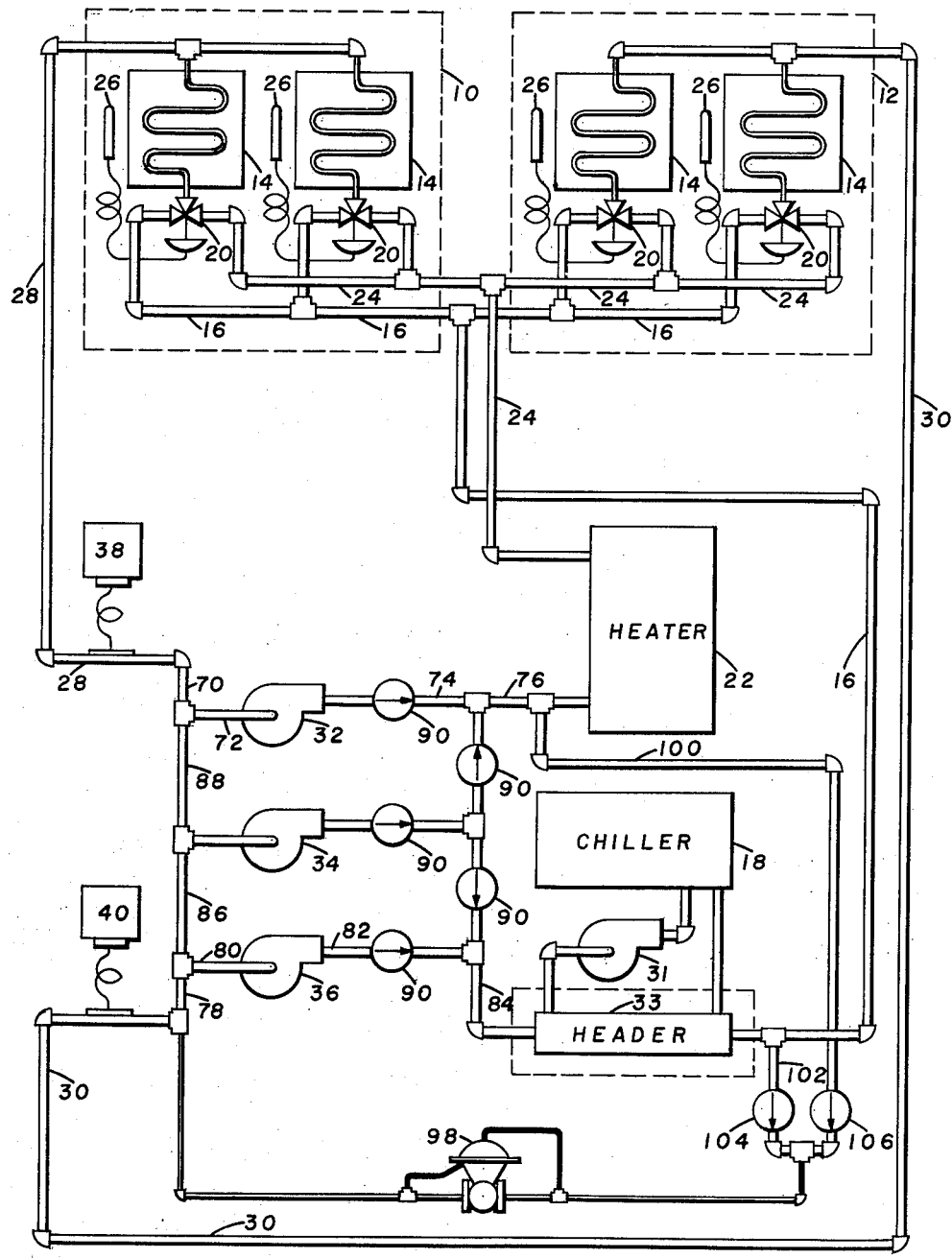
Figure 2:
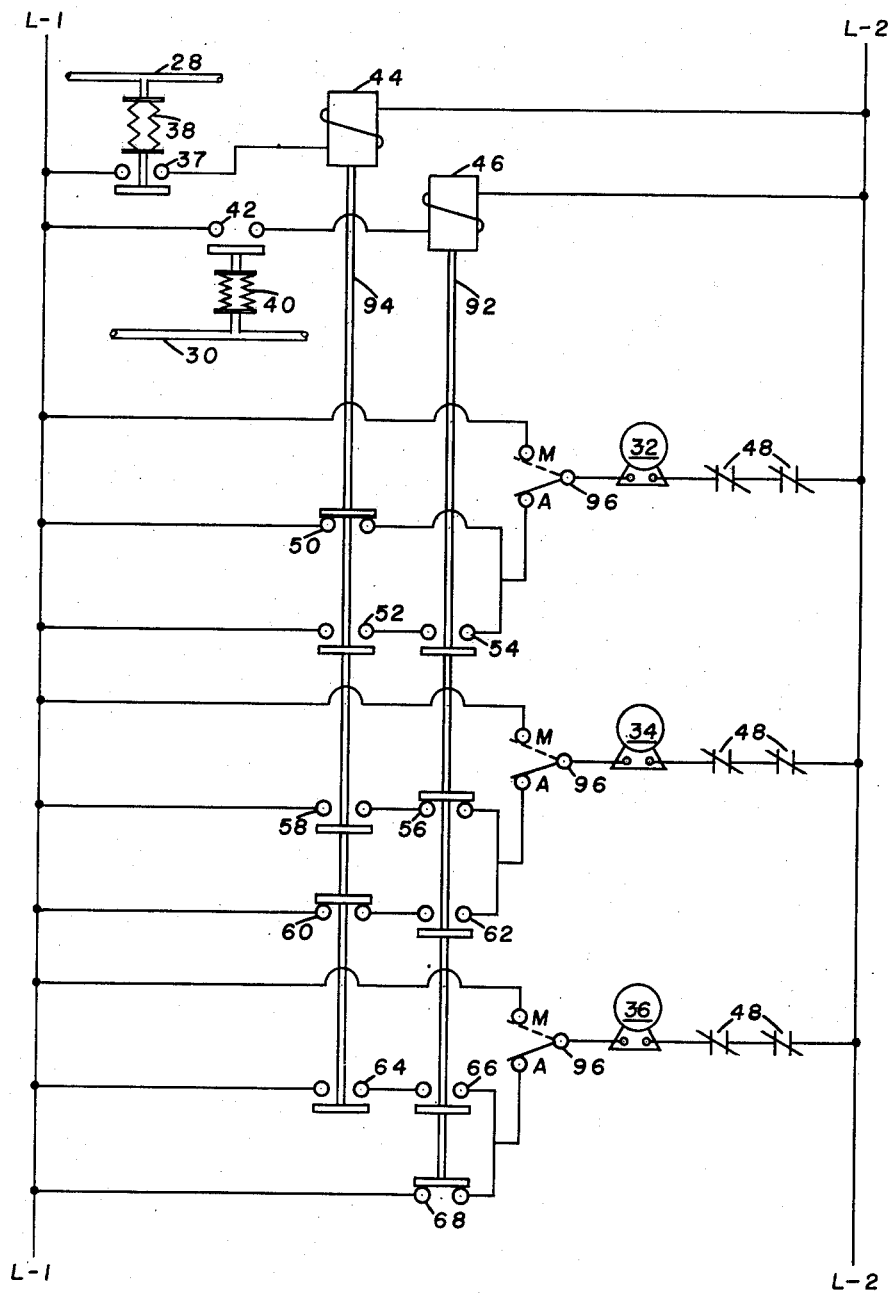

Other objects and advantages of the invention will be clearly apparent as the specification proceeds to describe the invention with reference to the accompanying drawings in which:

FIGURE 1 is a schematic flow diagram of an air conditioning system incorporating my invention; and FIGURE 2 is a circuit diagram showing the pump control on a line to line wiring diagram.

Looking now to FIGURE 1 our new and improved control system is shown applied to an air conditioning system having two zones 10 and 12. For the sake of discussion these zones will be denoted as the north zone and south zone respectively. Located within each zone are a plurality of heat exchange units 14. The size and number of such units depending on the requirements of the particular areas to be conditioned within the respective zones.

Cold water through conduit 16 from chiller 18 is supplied to thermostatic valve 20 on the inlet side of each heat exchange unit 14. Hot water from heater 22 is also supplied to thermostatic valve 20 of each unit through conduit 24. For the sake of discussion thermostatic valve 20 is shown as a three-way valve but obviously two two-way valves could be employed, if desired.

Thermostatic valve 20 depending on the temperature sensed by the sensing element 26 in the particular area to be conditioned supplies either hot or cold heat exchange fluid to the heat exchange unit 14 conditioning the area. The heat exchange fluid in each zone 10 and 12 is then manifolded and return in a common zone return to the heater 22 or chiller 18 by way of common return 28 or 30. It is obvious that the return water from one heat exchange unit 14 in a particular zone may be hot and the return water from another unit in the same zone may be cold thereby resulting in a return water temperature which will lie somewhere between the two extreme temperatures.

The chilled water is shown pumped by pump 31 through a header 33 in the chiller loop. This is done so that any amount of water as used by the zones, whether large or small, will have no effect on the constant g.p.m. required by the chiller 18. If desired, the chiller loop may be omitted and the chiller located as shown in dotted lines.

The north zone return line 28 is shown directed to the heater 22 and the south zone return line 30 is directed to the chiller. In all instances the zone which is predominately a heating zone should be directed to the heater while the zone predominately requiring cooling should be directed to the chiller. These conditions are readily determined by anyone versed in the art and will not herein be discussed.

Looking now to both FIGURES 1 and 2 the operation of the pumps 32, 34, and 36 will be discussed. Assuming that the north zone 10 is returning warm water and the south zone 12 is returning cold water the control circuit of FIGURE 2 will be as shown. Temperature controller 38 in common return will maintain switch 37 open and temperature controller 40 in south zone common return line 30 will maintain switch 42 open. As shown temperature controllers 38 and 40 are shown as bellows type controls but obviously other equivalent type of controls could be employed. Since both switches 37 and 42 are open, relay holding coils 44 and 46 will not be energized thereby allowing relay contacts 50, 56, 60, and 68 to close. Pumps 32 and 36 will be energized through relay contacts 50 and 68 while pump 34 will be idle since open relay contacts 58 and 62 interrupt the circuit to pump 34 from L–1 to L–2. Pump 32 will then tend to return the warm return water in return 28 predominately to the heater 22 through conduits 70, 72, 74, and 76 and pump 36 will tend to return the cold water in common return 30 predominately to the chiller through conduits 78, 80, 82, and 84. A cross-over pipe consisting of conduits 86 and 88 has been provided between conduits 70 and 78 on the suction side of pumps 32, 34, and 36 to allow return water to cross over from one circuit to the other when the heat exchange fluid demand from one of the circuits is greater than the heat exchange fluid being supplied by the pump. Further, the cross-over pipe allows pump 34 to draw heat exchange fluid from either of the common returns 28 or 30 depending upon the temperature sensed.

Check valves 90 are employed on the discharge side of the pumps to prevent heat exchange fluid from passing from one circuit to another.

Overload switches 48 are provided in each of the pump-circuits to interrupt the power supply in case of an increase of current flow in the circuit due to any abnormal condition.

Assuming now that hot water is returning in both common returns 28 and 30. Temperature controller 38 will still be holding switch 37 open but temperature controller 40 in the south zone return line 30 will close switch 42 thereby energizing relay holding coil 46. When relay holding coil 46 is energized control rod 92 will be moved upwardly closing relay contacts 66, 62, and 54 and opening relay contacts 56 and 68. Pump 34 will be energized through relay contacts 60 and 62 and pump 32 will remain energized through relay contacts 50. Pump 36 will be idle since relay contacts 64 and 68 will be open. Since little or no chilled water is being drawn from the chiller, pumps 32 and 34 will tend to pump the hot water from north and south common returns 28 and 30 predominately to the heater 22.

Assuming now that cold water is being returned from both the north and south zones in common returns 28 and 30, temperature controller 38 will close switch 37 and temperature controller 40 will open switch 42. Relay holding coil 44 will then be energized moving control rod 94 upwards closing relay contacts 52, 58, and 64 and opening relay contacts 50 and 60. Relay holding coil 46 and control rod 92 will be in the position shown in FIGURE 2. Pump 32 will be idle since relay contacts 50 and 54 will be open. Pump 34 will be energized through relay contacts 58 and 56 and pump 36 will be energized through relay contact 68. The cold water from both zones will then be pumped to the chiller 18 since little or no water is being pumped from the heater 22.

The only other possible situation would be the unusual one where cold water would be returning from the north zone and hot water would be returning from the south zone. The situation would obviously not occur if the space or building to be air conditioned is zoned properly, and therefore will not be discussed.

It should be noted that two-way switches 96 have an M (manual) and an A (automatic) position. The operation discussed above was the automatic position with the switch in the position shown in solid lines in FIGURE 2. If desired, each of the pumps 32, 34, or 36 can be operated manually by positioning the switches 96 as shown in dotted lines. This may be necessary in case of a pump failure, cleaning of pumps, etc.

It is possible that pump 32 or 36, or both may be pumping and momentarily none of the heat exchange units may be requiring heating or cooling. This situation will cause one pump or the other, or both to overheat and possibly cause damage to the pump. To alleviate this situation a differential pressure valve 98 is connected to both the hot loop and the cold loop by conduits 100 and 102. This allows heat exchange fluid from one of the loops or both to be circulated to the pumps to lubricate and cool same. Check valves 104 valves 104 and 106 are provided to prevent hot fluid from short circuiting into the cold loop and vice versa when only cooling or heating is being required and both pumps 32 and 36 are operating.

Obviously I have provided a new and novel pump control system which is readily installed and provides for economic operation of the air conditioning system. As pointed out previously, the three-pipe system which eliminates the use of one return line is not economical to operate since the hot and cold return water are mixed in a single return and then split off at the chiller and the heater. This tends to result in supplying comparatively warm water to the chiller and comparatively cold water to the heater. My new and novel pump control system eliminates this unnecessary waste by thermostatically controlling a series of pumps so that cold water is returned to the chiller and warm water is returned to the heater thereby taking advantage of the lower installation cost of the three-pipe system but eliminating the high operating costs of such a system by control of the mixed return water. Further, my new and improved control system provides a pump member which may be considered a standby in case of failure of one of the pumps in the system. Merely switching the control circuit to the manual position allows the selective repair of any of the three pumps in the system without completely shutting down either the hot or cold heat exchange fluid supply. Economically the initial cost of the pumps in my system would be much lower than the normal system where one pump is provided to handle both the heating and cooling circulation load and one pump is provided for standby. Obviously three pumps and starters each sized to handle half the load are cheaper than two pumps with starters to each handle the entire load.

Although I have described in detail the preferred embodiment of my invention, it is contemplated that many changes may be made without departing from the scope or spirit of my invention and I desire to be limited only by the claims.

I claim:

1. In an air conditioning system including first and second zones to be conditioned, a plurality of heat exchange units in each of said zones, a first conduit means for supplying a warm heat exchange fluid to each of said heat exchange units in each of said zones, a second conduit means for supplying a cold heat exchange fluid to each of said exchange units in each of said zones, separate valve means connected to each of said heat exchange units and to said first and second conduit means to selectively supply warm or cold heat exchange fluid to said heat exchange units as required, a heater, a cooler, means connecting said heater to said first conduit means, means connecting said cooler to said second conduit means, the improvement comprising: a first common return conduit means operably connected to each of said heat exchange units of said first zone for returning simultaneously spent warm and cold heat exchange fluid therefrom; a second common return conduit means operably connected to each of said heat exchange units of said second zone for returning simultaneously spent warm and cold heat exchange fluid therefrom; and thermostatically controlled pump means connected to both of said common return conduit means to return warm heat exchange fluid from said common return conduits predominately to said heater and cold heat exchange fluid predominately to said cooler in response to temperature of the heat exchange fluid in the respective common return conduit means.

2. The apparatus as defined by claim 1 wherein a crossover pipe is connected between said first common return conduit means and said second common return conduit means.

3. The apparatus as defined by claim 1 wherein said thermostatically controlled pump means is comprised of a first pump operably connected between said first common return conduit means and said heater; a second pump operably connected between said second common return conduit means and said cooler; a third pump having an inlet operably connected to each of said common return conduit means and an outlet operably connected to said heater and said cooler; and a control means responsive to the temperature of the heat exchange fluid in said first and second common return conduit means to energize said first and third pumps when the heat exchange fluid in both of said common return conduit means is warm and to energize said second pump and said third pump when the heat exchange fluid in both of said common returns is cold.

4. The apparatus as defined by claim 3 wherein check valves are provided between said first and said second pumps to prevent heat exchange fluid from said second pump from being pumped to said heater and to prevent heat exchange fluid from said first pump from being pumped to said cooler.

5. The apparatus as defined by claim 3 wherein a cross-over pipe is connected between said first and second common return conduit means upstream of said first and second pumps; the inlet of said third pump making fluid communication with said first and second common return conduit means via said cross-over pipe.

6. The apparatus as defined by claim 5 wherein check valves are provided between said first and said second pumps to prevent heat exchange fluid from said second pump from being pumped to said heater and to prevent heat exchange fluid from said first pump from being pumped to said cooler.

References Cited by the Examiner
UNITED STATES PATENTS

| | | | |
|---|---|---|---|
| 2,216,245 | 10/40 | Larson | 236—1 |
| 2,357,706 | 9/44 | Toepperwein | 257—314 |
| 2,796,740 | 6/57 | McFarlan | 165—29 |
| 2,797,068 | 6/57 | McFarlan | 165—29 |
| 2,915,298 | 12/59 | Hamlin et al. | 165—27 |
| 3,024,008 | 3/62 | Blum | 154—22 |

CHARLES SUKALO, *Primary Examiner.*

HERBERT L. MARTIN, FREDERICK L. MATTESON, Jr., *Examiners.*